United States Patent [19]

Feinland et al.

[11] Patent Number: 4,479,561
[45] Date of Patent: Oct. 30, 1984

[54] WEIGHING CELL

[75] Inventors: Seymour Feinland, Stamford; Gerald C. Freeman, Darien; Vincent F. Viera, Milford; Paul R. Sette, Hamden, all of Conn.

[73] Assignee: Pitney Bowes Inc., Stamford, Conn.

[21] Appl. No.: 458,247

[22] Filed: Jan. 17, 1983

Related U.S. Application Data

[63] Continuation of Ser. No. 239,267, Mar. 2, 1981, abandoned.

[51] Int. Cl.³ .................. G01G 23/02; G01G 21/10
[52] U.S. Cl. ................................. 177/154; 177/184
[58] Field of Search ............... 177/154, 184, 189, 239

[56] References Cited

U.S. PATENT DOCUMENTS 2,098,845 11/1937 Weber et al. .................. 177/239 X
4,278,139 7/1981 Caris ................................. 177/154

Primary Examiner—George H. Miller, Jr.
Attorney, Agent, or Firm—Robert H. Whisker; David E. Pitchenik; William D. Soltow, Jr.

[57] ABSTRACT

A weighing cell which is protected against overloading due to mechanical shock and delayed weight readout due to vibration. The weighing cell, which has a platform, a self-contained base and a load cell operatively connected therebetween, includes, in one embodiment, a plurality of posts connected to the base and separated from the platform by a gap to protect against overload forces applied to the non-axial region of the platform. Feet on the base of the weighing cell have an energy absorbing material thereon and are placed outboard of the load cell to provide quick damping of vibrations caused when a load is placed on the platform. The load cell is spaced at a partial gap from the base and platform to protect it from overload forces applied to the axial region of the platform.

12 Claims, 2 Drawing Figures

WEIGHING CELL

This is a continuation of application Ser. No. 239,267, filed Nov. 2, 1981 now abandoned.

BACKGROUND OF THE DISCLOSURE

This invention relates generally to an apparatus for weighing objects, and more particularly, to a weighing cell having protection from overload forces applied to the scale's platform and rapid vibrational damping to reduce the time that an accurate readout is produced after a load is placed thereon.

In weighing cells, such as the type commonly used to weigh articles for determining postage, it is desirable to provide protection against the cell being overloaded, particularly by shock loads. Such overloading tends to force the cell out of calibration. U.S. Pat. No. 4,107,985 discloses one approach to this problem. A parallelogram structure is utilized to make the load cell insensitive to, and unaffected by, off-center loading. In this type of structure, the bending moment produced by non-axial loading is transmitted to restraining arms in the load cell rather than through the force measuring element, of sensing beam. Axial over-loading, on the other hand, is prevented by the mechanical interfacing of the load cell and its base which is separated at a partial gap therefrom.

More recently, load cells of high accuracy and low cost have been made available for application to weighing cells. These devices, called single-point load cells, generally have safe overload margins in excess of their rated capacities and give accurate weighing of objects regardless of where the object is placed on the platform. With the commercial introduction of these newer load cell designs, it is possible to replace the complicated parallelogram structures formerly used in weighing cells with more economical structures which concentrate on shock overload protection and the lessening of vibrational damping time.

U.S. Pat. No. 4,181,001 discloses a representative single point load cell. The device disclosed in this patent is primarily directed to eliminating the effects of internal axial forces, such as those produced by machining, fabrication stresses or temperature gradients, on the sensing beam. It seeks to provide better accuracy and linearity, as well as off-center load capabilities. This structure isolated the sensing beam from all extraneous forces through the configuration of the load cell itself. Only the axial forces placed on the load cell find their way to the sensing beam. All other forces are funneled away form the sensing beam and to another member within the parallelogram structure.

Accordingly, it is a primary object of the present invention to improve weighing cell by providing shock overload protection.

It is another object of the present invention to lessen the time to dampen vibrations produced when an object is placed on the platform of the weighing cell.

It is another object of the present invention to improve axial overload protection in weighing cells.

It is another object of the present invention to improve non-axial overload protection in weighing cells.

SUMMARY OF THE INVENTION

Briefly stated, and in accordance with the present invention, protection is provided to a weighing cell against overloads, particularly those resulting from mechanical shocks. In addition, the damping time, after which the scale can provide an accurate reading, is shortened. In accordance with the present invention, an improved weighing cell is protected from overloading, by limiting the force that can be placed on the load cell. Overloads applied to the axial region of the scale's platform are prevented from acting on the load cell by limiting the amount of movement between the load cell and the weighing cell base and/or platform. Overloads applied to the non-axial region of the scale's platform are prevented from acting on the load cell by limiting: the amount of movement between the platform and base, independently of the load cell support structure. The time it takes to dampen the vibrations created in the weighing cell after a load is placed thereon is shortened by damping material located on the base.

BRIEF DESCRIPTION OF THE DRAWINGS

Other objects and advantages of the present invention will become apparent upon reading the following detailed description with reference to the drawings wherein.

While the present invention is described in connection with a preferred embodiment and associate method of use thereof, it is to be understood that it is not intended to limit the invention to this embodiment and method of use. On the contrary, it is intended to cover all alternatives, modifications and equivalents as may be included within the spirit and scope of the invention as defined by the appended claims.

DETAILED DESCRIPTION OF THE INVENTION

Figure 1:
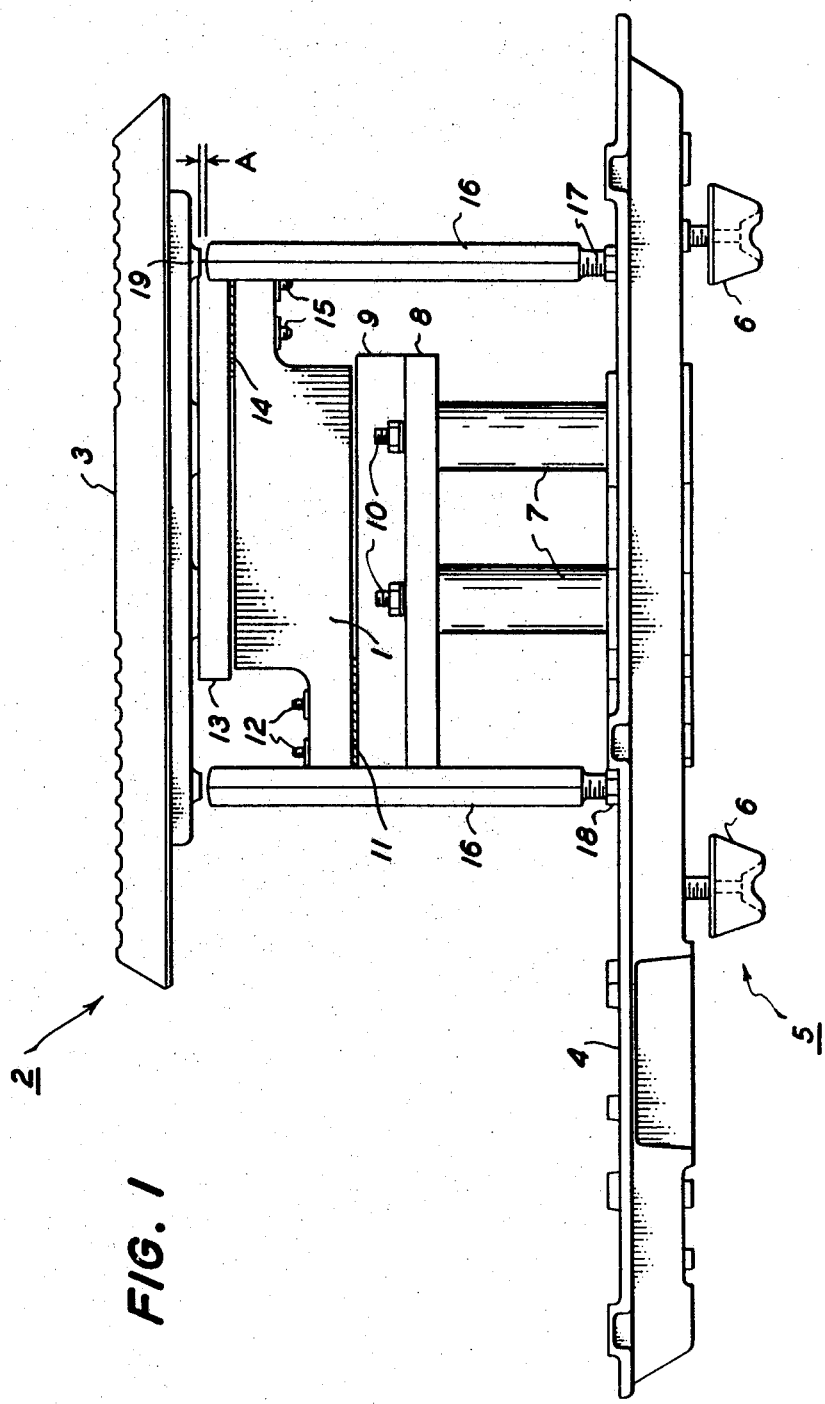
FIG. 1 illustrates schematically a preferred embodiment of the weighing cell including the overload protection devices and damping means.
Figure 2:
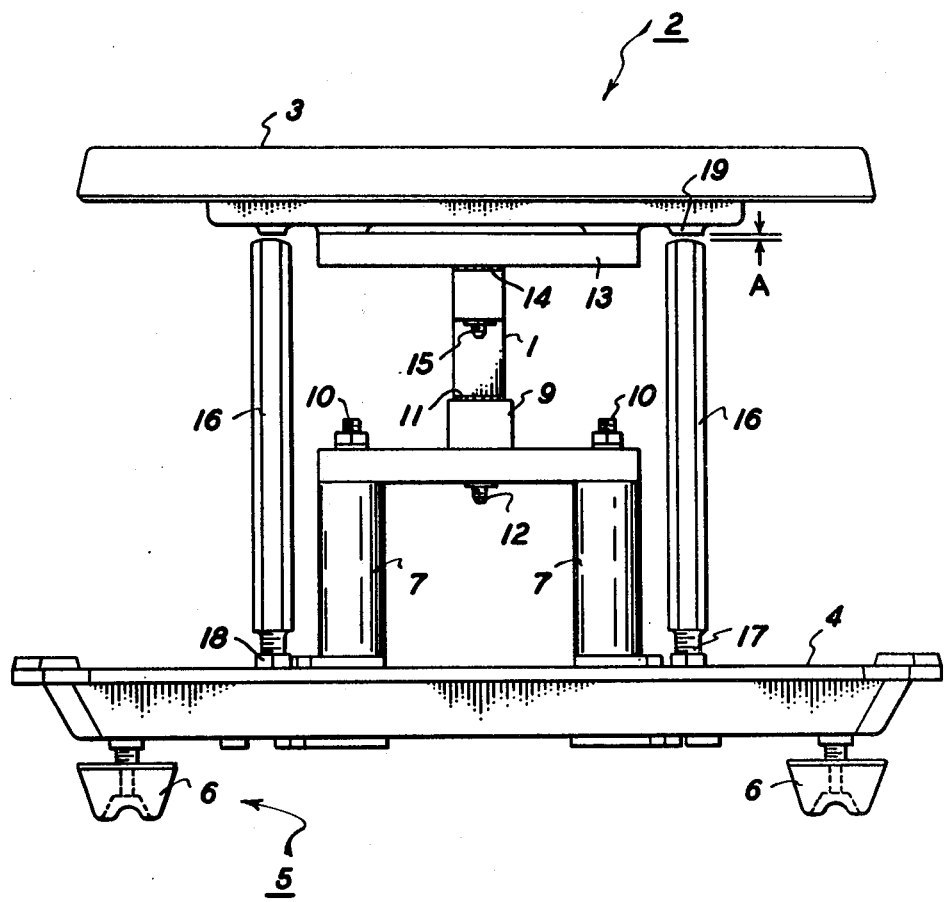
FIG. 2 is a side view of the apparatus shown in FIG. 1.

Referring more particularly to the drawings, wherein like reference numerals have been used throughout to designate like elements, FIGS. 1 and 2 illustrate schematically one embodiment of the weighing cell apparatus.

The weighing cell is used in a typical weighing scale environment, such as to weigh articles to be mailed. The scale includes a weighing cell which functions to receive the articles to be weighed and produce a signal corresponding to the weight, a display, such as a seven-segment display, to tell the operator the weight of the article and suitable electronics to transform the signal from the weighing cell to an operator readable display.

The weighing cell portion of the scale includes a platform to receive and hold the articles to be weighed, a base member supportable to mechanical ground and a load cell adapted to convert the force of the load placed on the platform into a usable output such as an electrical signal. The term "mechanical ground" means any suitable surface or support means such as a table, which will hold the weighing scale while in use. It should be sufficiently stable so as not to materially affect the accuracy of the weighing process. Mechanical ground is also used to refer to any position of the scale which has no relative motion to the table.

In weighing cells, such as the one described herein, the weight is ultimately determined by a load cell which creates a difference of voltage corresponding to the weight of the object on the platform. Although any suitable load cell can be used, load cells typically contain a strain gage in the form of a fine wire arranged in a pattern and cemented to a piece of metal that will be subjected to physical strain. The fine wire will have some small amount of resistance when the metal to which it is cemented is not under strain. When the metal is distorted, the attached wire, due to its elasticity properties, will be stretched. This, in turn, reduces the wire diameter and increases its length so that the resistance within the wire is changed. The differences in resistance are converted to changes in voltage through the use of a basic bridge circuit. The wire, itself, rather than the piece of metal, is the strain gage. This configuration is commonly used in modern load cells of high accuracy.

The load cell produces a difference in voltage due to the basic bridge circuit employed and this voltage is applied through signal conditioning electronics to any suitable monitoring device which forms a display to the operator of the weight of the article. Present day scales frequently employ microprocessors which, in turn, drive digital display devices for quick and accurate display of the weight.

FIGS. 1 and 2 are directed to the weighing cell, per se. The weighing cell 2, shown in both figures, contains a load cell sub-assembly 1, a weighing platform 3 and base member 4. Base member 4 contains any suitable support members 5, such as the adjustable feet 6 shown in the figures. The purpose of the feet is to fix the weighing cell to mechanical ground, such as the top surface of a desk or table, while the scale is being used to weigh articles.

The four feet, 6, shown in this embodiment are located outboard of the load cell 1 and supporting structure thereof. The feet can be placed at any convenient location on the base to render support for it. It is preferable, however, to locate the feet outboard of the load cell and supporting structure, as in the figures. The load cell and supporting structure are located entirely within the area between feet 6. The supporting structure should be a rigid member between the load cell and the feet.

The feet are made of or covered with a suitable energy absorbing material. This material serves to dampen oscillations of various types in the scale system, the most critical being the equivalent mass spring system consisting of the load cell as a torsion spring and the combined weight of the weighing scale and object weight. Any suitable energy absorbing material can be used for this purpose. One type of material found to be useful is "E-A-R Isodamp C-1002", an energy absorbing meterial manufactured by the E-A-R Corporation. "E-A-R Isodamp" is a trademark of E-A-R Corporation of Indianapolis, Ind. Feet 6 are also adjustable so that the weighing cell can be placed in a secure and level position relative to the surface upon which it rests.

The base member 4 has attached to it spacers 7 which, in turn, have lower adapter plate 8 and upper plate 9 physically attached thereto by bolt and nut assemblies 10. Load cell 1 is placed adjacent upper adapter plate 9 and separated therefrom by lower shim 11. bolt and nut assemblies 12 rigidly connect the load cell, shim and upper adapter plate 9. On top of load cell 1 is a platform 3 suitable for supporting objects to be weighed. The objects are placed on the top surface of the platform by the operator for this purpose. Weighing platform 3 has fixedly connected to it upper mating plate 13 which, in turn, is secured to upper shim 14 and load cell 1 by screw and nut assmeblies 15. Load cell 1 is thereby separated from upper mating plate 13 and upper plate 9 by a partial gap. The gap is produced by the placement of shims 14 and 11, respectively, and is "partial" because the gap extends only in those areas outside of the shims.

Through this structure it can be seen that all of the components, including load cell 1, described above and located between platform 3 and feet 6 are securely attached. These components make up the portion of the weighing cell which enables an electrical signal to be produced by the load cell corresponding to the weight of an object placed on the platform. When an object is placed on platform 3, the force of its weight acts on platform 3 and against upper mating plate 13 which, in turn, acts on shim 14 and onto load cell 1. Load cell 1 is, in turn, supported by feet 6 connected through base 4, spacers 7, adapter plates 8 and 9 and shim 11. When a force is placed on platform 3, the force is transmitted down to the load cell while shim 11, through its support elements including feet 6, is supported at mechanical ground. This arrangement causes load cell 1 to deflect and produce a signal corresponding to the weight on the scale.

Load cell 1 can be any suitable type presently available. An example of such a load cell presently available is the Platform Sensor sold by Revere Corporation of American of Wallingford, Connecticut. In this instance, the load cell is a single-point-type cell which produces an accurate signal corresponding to the weight on the platform 3 regardless of where the weight is placed on the platform. Suitable electrical leads (not shown) on load cell 1 are fed out of the weighing cell to signal conditioning electronics. The signal conditioning electronics typically consists of a preamplifier to increase the weighing cell's small output changes and a low-pass filter to stabilize these outputs in the presence of electrical noise and ground vibration.

Platform 3, upper mating plate 13, adapters 8 and 9, support 7, and base member 4 can be made of any suitable material such as steel, which has the strength and stiffness to support the weights expected on the scale. However, alternate materials such as aluminum, as well as others, can be used for this purpose. Shims 11 and 14 can be made of any suitable material able to withstand the pressure placed on the upper and lower portions of the load cell 1 during the weighing process. One suitable material for the shims is brass. The thickness of the shims is selected to maintain a pre-determined partial gap between the adjacent surfaces. The thickness must be greater than the distance the platform moves when weighing an object at the scale's rated capacity, but small enough to enable the gap to close before the load cell maximum overload capability is exceeded.

The purpose of the shims is to provide a mechanical interface between upper mating plate 13 and load cell 1 and upper adapter plate 9 and load cell 1 when an overload force is applied to the axial region of the platform. The "axial region of the platform" means that region directly over the load cell. For instance, assuming one were to view the platform from directly above and trace on the platform itself the outline of the load cell lying thereunder, the tracing would substantially define the "axial" region of the platform. "Overload" means a force applied to the platform which, if the invention were not used, would cause the scale to exceed its intended operational capacity. An example of this would be when a heavy object to be weighed is inadvertently dropped by the operator onto the platform from a point directly above the platform.

Assuming that the weighing cell is designed to accommodate objects up to 70 pounds, there may be those situations in which a much greater weight is placed on the weighing cell and load cell. This greater weight may be applied to the platform by the force of an object having much greater weight, or by the force of an object dropped onto the platform from a distance above it. This latter condition, overload produced by shock, will produce a peak force much greater on the weighing cell than the same object placed directly on the platform.

The load cell, although it may have a safe overload margin, must be protected against overload forces applied to the axial region of the platform at some predetermined force value in excess of that produced by 70 pounds. Assuming, hypothetically, that the load cell is designed to have a safe overload margin up to 100 pounds before its calibration is permanently disturbed, and thus placed out of calibration, the thickness of shims 11 and 14 are made to allow upper mating plate 13 and upper adapter 9 to make physical contact with the load cell surfaces when a force equivalent to an object of between 70 and 100 pounds is placed on the platform.

The partial gap produced by shims 11 and 14 is sufficient to allow mechanical interfacing between the mating plate and upper adapter plates with the load cell at some predetermined point of force equivalent to that produced by an object between 70 and 100 pounds. Shim 11, and the partial gap produced thereby, is intended to provide a mechanical interface and overload protection primarily for forces applied to the right side of the platform in FIG. 1. Shim 14, and the partial gap produced thereby, is intended to perform the same function primarily for forces applied to the left side of the platform in FIG. 1. An equally effective method of achieveing a suitable protective gap size is with adjusting screws. The shims can be replaced with spacer blocks large enough to accommodate the largest gap desired. The adjustable screw can be placed on the load cell or member on the other side of the gap and adjusted in height according to operating conditions. If the screw were located on the load cell, the size of the gap would be measured between the screw head and upper adapter plate.

A further overload protection device exists in the weighing cell in the embodiment of posts 16 which are secured to base 4. The height of the posts are adjustable by the interaction of threaded portions 17 and locking nuts 18. Any suitable number of posts can be provided in a particular scale. In a rectangular shaped platform, four posts are preferable. The posts act in a manner on the weighing cell that is completely independent of the load cell itself.

In the apparatus shown in FIGS. 1 and 2, there are 4 posts, one near each corner of the weighing platform. The posts are designed, after adjustment, to be fixed relative to base 4. There is a gap "A" between the underside of platform 3 and the top of the posts. The top of the posts act as bearing surfaces upon which bosses 19 on the underside of the platform can rest in an overload condition.

The purpose of the posts is to protect the load cell from overload forces and particularly shock over-loading, applied to the non-axial regions of the platform. Under normal operating conditions; that is, when the force of the object being weighed is within the range of the scale, the platform does not close gap "A" between the underside of the platform and the top of the posts. However, when an overload force is applied to the non-axial region of the platform and the rated capacity of the scale is exceeded, the underside of the platform bottoms out on one or more of the posts thereby protecting the load cell from the overload. The term "non-axial region of the platform" means the region of the platform outside the "axial region" defined previously. Overload forces applied to the non-axial region of the platform, particularly those applied near the edge of the platform that is paralled to the long dimension of the load cell, can be very damaging to the load cell. An example is when a heavy object to be weighed is inadvertently dropped or thrown near the side of the platform. Shims 11 and 14, and the associated partial gaps, do not necessarily protect the load cell from such non-axial overloading because the force is applied to the load cell in such a way that the load cell tends to twist. Damage can be done to the load cell by such twisting before the partial gap closes.

The size of gap "A" is determined as a function of how much overloading will be tolerated before the platform bottoms out and is a function of the capacity of the scale. The gap is preferably about twice the distance the platform moves when weighing an object at the scale's rated capacity. The posts 16, through thread portions 17 and lock nuts 18, can be adjusted to any suitable gap intended for "A". The underside of platform 3 is shown as having four bosses 19 which come into contact with the top of the post in the overload condition. The posts can be made of any suitable material which will take the stress placed on the scale by overload conditions. The posts act on the platform, in the overload condition, without reliance on the load cell and are attached directly to base 4.

The particular scale shown in FIGS. 1 and 2 has a capacity of 70 pounds and the load cell has an accurate operating range to 100 pounds. A typical safe overload limit for a 100 pound load cell is in the 150 to 200 pounds range. The weighing cell is designed to have an overload condition occur when a force equivalent to approximately 120 pounds is placed on it. In this example, the following specifications can be applied to the weighing cell. The shim thickness for shims 11 and 14 should be in the range of 0.015 to 0.020 inches. Gap "A" between the posts 16 and bosses 19 should be in the range of 0.060 to 0.100 inches. Shim thicknesses are a function of the full scale displacement of the load cell and will vary for load cells made by different manufacturers. Gap "A" is a function of the torsional rigidity of the load cell about an axis through its long dimension. This will also vary for load cells made by different manufacturers.

This scale, although rated at 70 pounds, will be able to safely withstand a force equivalent to a 120 pound weight on the platform without deleteriously affect the load cell. When a force equivalent to a weight greater than 120 pounds is placed on the platform, the load cell will be protected from overload forces applied at both axial and non-axial regions of the platform by shims 11 and 14 and by gap "A" and posts 16, respectively, depending upon how and where the overload is applied. If the overload force is applied substantially over the load cell; i.e., in the axial region, it is likely that the partial gaps produced by shims 11 and 14 will be closed thereby making a mechanical interface between the lower surface of upper mating plate 13 and the top of load cell 1 and/or the upper surface of adapter plate 9 and the bottom side of the load cell. However, if the overload force is applied substantially outside the load cell region; i.e., in the non-axial region and this force is equivalent to a weight greater than 120 pounds, gap "A" will be closed thereby providing a mechanical interface between the platform and the base independently of the load cell. It is pointed out that either the partial gaps produced by the shims or gap "A" is free to function in the case of a particular overload placed on the platform and these may work in combination to protect the weighing cell from overload. The sizes of the partial gaps produced by the shims and gap "A" are to be chosen so that normal, non-overload weighing on the weighing cell can be accomplished without the mechanical interfacing described above.

The use of energy absorbing feet 6 minimize the delay in weighing time otherwise observed when an object is placed on the platform. The placement of a weight on the side of the platform, in particular, produces a long duration oscillation of the weighing cell structure. The energy absorbing feet serve to quickly dampen these oscillations and substantially shorten the time to reduce the vibrations to the point of making an accurate measurement of weight. The special feet are placed outboard of the weighing cell in a position where their energy absorbing properties serve to dampen the oscillations most effectively. Without the energy absorbing feet, typical delays observed are 3 to 12 seconds for heavier objects. With their use, suitable damping occurs in about one second.

It should be understood that the foregoing description is only illustrative of the invention. Various alternatives and modifications in the structural and functional features of the weighing cell can be devised by those skilled in the art without departing from the invention. Accordingly, the present invention is intended to embrace all such alternatives, modifications and variations and fall within the spirit and scope of the appended claims.

What is claimed is:

1. A weighing cell for determining the weight of objects, comprising:
   (a) a support to support such object while it is being weighed;
   (b) a base member means for supporting said weighing cell;
   (c) a load cell operatively connected between said support and said base member means, said load cell providing an output signal corresponding to the load placed on said support by said object;
   (d) protecting means for protecting said load cell from overload forces applied to said support; and
   (e) damping means for substantially reducing the time required for vibrations caused when such object is placed on said platform to decrease to a level such that the weight of such object may be determined, said damping means being operatively positioned between said base member means and a mechanical ground.

2. A weighing cell as described in claim 1 wherein said damping means is chosen to substantially dampen the oscillations of a mass spring system consisting of a torsion spring equivalent to said load cell and a mass equal to the combined mass of the heaviest object to be weighed and of the weighing cell.

3. A weighing cell as described in claim 1 wherein said damping means comprises an energy absorbing material attached to said base member for supporting said weighing cell on a mechanical ground, said energy absorbing material being selected to have elasticitiy and resilience such that said material approximates a conventional spring and viscous damper damping means which would substantially reduce said required time.

4. A weighing cell as described in claim 3 wherein said damping means is chosen to substantially dampen the oscillations of a mass spring system consisting of a torsion spring equivalent to said load cell and a mass equal to the combined mass of the heaviest object to be weighed and of the weighing cell.

5. A weighing cell as described in claim 3 wherein said base member means further comprises a plurality of adjustable feet and said energy absorbing material is attached to said feet.

6. A weighing cell as described in claim 5 wherein said feet are adjustable to provide level support for said weighing cell.

7. A weighing cell as described in claim 5 wherein said feet are positioned outboard of said load cell.

8. A weighing cell as described in claim 3 wherein said required time is reduced to approximately 1 second.

9. A weighing cell as described in claim 8 wherein said damping means is choosen to substantially dampen the oscillations of a mass spring system consisting of a torsion spring equivalent to said load cell and a mass equal to the combined mass of the heaviest object to be weighed and of the weighing cell.

10. A weighing cell as described in claim 8 wherein said base member means further comprises a plurality of adjustable feet and said energy absorbing material is attached to said feet.

11. A weighing cell as described in claim 10 wherein said feet are adjustable to provide level support for said weighing cell.

12. A weighing cell as described in claim 10 wherein said feet are positioned outboard of said load cell.

* * * * *